United States Patent
Khuti et al.

(10) Patent No.: US 9,680,716 B2
(45) Date of Patent: Jun. 13, 2017

(54) SYSTEM AND METHOD FOR MONITORING AND MANAGING DATA CENTER RESOURCES IN REAL TIME INCORPORATING MANAGEABILITY SUBSYSTEM

(71) Applicant: AVOCENT HUNTSVILLE CORP., Huntsville, AL (US)

(72) Inventors: Bharat A. Khuti, Huntsville, AL (US); Sasha Jovicic, Huntsville, AL (US); Steven Geffin, Miami, FL (US)

(73) Assignee: AVOCENT HUNTSVILLE, LLC, Huntsville, AL (US)

( * ) Notice: Subject to any disclaimer, the term of this patent is extended or adjusted under 35 U.S.C. 154(b) by 112 days.

(21) Appl. No.: 14/364,252

(22) PCT Filed: Dec. 12, 2012

(86) PCT No.: PCT/US2012/069146
§ 371 (c)(1),
(2) Date: Jun. 10, 2014

(87) PCT Pub. No.: WO2013/090365
PCT Pub. Date: Jun. 20, 2013

(65) Prior Publication Data
US 2014/0337474 A1 Nov. 13, 2014

Related U.S. Application Data

(60) Provisional application No. 61/569,583, filed on Dec. 12, 2011.

(51) Int. Cl.
G06F 15/16 (2006.01)
H04L 12/24 (2006.01)
(Continued)

(52) U.S. Cl.
CPC ...... *H04L 41/5077* (2013.01); *G06F 11/3006* (2013.01); *G06F 11/3082* (2013.01);
(Continued)

(58) Field of Classification Search
CPC ... H04L 41/5077; H04L 41/02; H04L 41/042; H04L 41/0631; H04L 41/0604; G06F 11/3082; G06F 11/3086
See application file for complete search history.

(56) References Cited

U.S. PATENT DOCUMENTS 6,473,407 B1 * 10/2002 Ditmer ................ G06F 11/0709
370/252
7,765,286 B2 7/2010 Mark
(Continued)

FOREIGN PATENT DOCUMENTS

CN 101032427 A 9/2007

OTHER PUBLICATIONS

Bartosz Balis et al. "On-Line Grid Monitoring Based on Distributed Query Processing", Sep. 11, 2011, Parallel Processing and Applied Mathematics, Springer Berlin Heidelberg, Berlin, Heidelberg, pp. 131-140, XP047009821, ISBN: 978-3-642-31499-5.
(Continued)

*Primary Examiner* — Nam Tran
(74) *Attorney, Agent, or Firm* — Harness, Dickey & Pierce, P.L.C.

(57) ABSTRACT

A method is disclosed for forming a distributed data store using a remote access appliance associated with a data center infrastructure management (DCIM) system. Data may be generated which is associated with operation of managed device being monitored by the DCIM system. At least one remote access appliance may be used to receive the data. An element library framework may be used by the remote access appliance to generate events from the data.
(Continued)

The remote access appliance may also be used to implement a complex event processing subsystem to analyze the events and to generate event related signals therefrom. A bus may be used to transmit the event related signals from the appliance to a common platform services (CPS) subsystem of the DCIM system. The CPS subsystem may be used to receive the event related signals and to use the event related signals to inform the user of an aspect of performance of the managed device.

17 Claims, 9 Drawing Sheets

(51) Int. Cl.
  *G06F 11/30* (2006.01)
  *G06F 11/34* (2006.01)
(52) U.S. Cl.
  CPC ...... *H04L 41/5038* (2013.01); *G06F 11/3442* (2013.01); *G06F 11/3476* (2013.01); *G06F 2201/81* (2013.01); *G06F 2201/86* (2013.01); *H04L 41/0604* (2013.01); *H04L 41/0631* (2013.01)

(56) References Cited

U.S. PATENT DOCUMENTS

| | | | | |
|---|---|---|---|---|
| 8,589,949 | B2* | 11/2013 | Biazetti | G06F 9/541 709/223 |
| 2009/0077211 | A1* | 3/2009 | Appleton | H04L 41/069 709/223 |
| 2009/0210755 | A1 | 8/2009 | Sawczak et al. | |
| 2010/0287361 | A1* | 11/2010 | Grell | G06N 5/045 712/233 |
| 2011/0154367 | A1* | 6/2011 | Gutjahr | H04L 41/064 719/316 |
| 2011/0187488 | A1 | 8/2011 | Fiske et al. | |
| 2011/0209146 | A1 | 8/2011 | Box et al. | |

OTHER PUBLICATIONS

Waldemar Hummer et al. "Dynamic Migration of Processing Elements for Optimized Query Execution in Event-Based Systems", Jan. 1, 2011, On the Move to Meaningful Internet Systems: OTM 2011, Springer Berlin Heidelberg, Berlin, Heidelberg, pp. 451-468, XP019168787, ISBN: 978-3-642-25105-4.

Adrian Mos et al. "Multi-level Monitoring and Analysis of Web-Scale Service Based Applications", Nov. 23, 2009, Service-Oriented Computing. ICSOC/ServiceWave 2009 Workshops, Springer Berlin Heidelberg, Berlin, Heidelberg, pp. 269-282, XP019153842, ISBN: 978-3-642-16131-5.

Antonia Bertolino et al. "Towards a Model-Driven Infrastructure for Runtime Monitoring", Sep. 29, 2011, Software Engineering for Resilient Systems, Springer Berlin Heidelberg, Berlin, Heidelberg, pp. 130-144, XP019166358, ISBN: 978-3-642-24123-9.

Extended European search report and the European search opinion mailed Jun. 2, 2015 in corresponding European Patent Application No. 12858092.5, 11 pages.

Katherine Broderick, 'Datacenter Infrastructure Management (DCIM): Bringing Together the World of Facilities and Cloud Computing.' IDC White Paper Sponsored by CA Technologies, pp. 1-12. Sep. 2011. See pp. 4-10.

Galen Schreck et al., 'Put DCIM into Your Automation Plans.' Forrester Research Inc. pp. 1-5, Dec. 9, 2009. See pp. 2-4.

First Office Action issued Mar. 3, 2016 in corresponding Chinese Patent Application No. 201280061412.5.

\* cited by examiner

SYSTEM AND METHOD FOR MONITORING AND MANAGING DATA CENTER RESOURCES IN REAL TIME INCORPORATING MANAGEABILITY SUBSYSTEM

CROSS REFERENCE TO RELATED APPLICATIONS

The present application is a §371 U.S. National Phase of PCT/US2012/069146, filed Dec. 12, 2012, which claims priority from U.S. provisional application Ser. No. 61/569,583, filed Dec. 12, 2011, the entire disclosures of which are incorporated herein by reference into the present application.

TECHNICAL FIELD

The present application is directed to systems and methods for managing the infrastructure associated with data centers, and particularly to a system and method for monitoring and managing hardware and software components of a modern day data center in a manner that optimizes the efficient use of the hardware and software components, and which also allows real time reconfiguration of the infrastructure components of the data center to meet changing needs and demands.

BACKGROUND

This section provides background information related to the present disclosure which is not necessarily prior art.

The common data center model has gone through many variations since its origins in mainframe computing. From distributed computers to the client/server model, the utilization of virtualized servers, grid consolidation, and most recently the trend toward utility or "cloud" computing, the demands on data centers are always changing and evolving, and the pace of that evolution is increasing as well.

Modern data centers are undergoing a broad transformation, which encompasses technical innovation, operational improvement, new design principles, changes in the data center supply chain, and changes to the relationship between IT and business. Thus, modern data centers are forming increasingly complex environments with many variables that must be taken into account when considering methods to optimize their efficiency. Along with this transformation comes the issue of energy efficiency and resource management, which will be vital to the success and long-term sustainment of these modern data centers. The ability to maximize efficiency depends upon being able to collect data from all the different components associated with the data center (i.e., IT and infrastructure), and to present the information in a useful way to the system administrators which enables them to make changes when necessary. In particular, with the growing capability of various types of sensors (e.g., air flow, voltage, temperature, humidity) that may be deployed in a data center environment, and the ability to obtain many thousands of real time data points from the outputs of such sensors, the need to analyze and summarize the large number of obtained data points is growing in importance. A challenge, however, has been how to collect and analyze the large number of data points obtained from the various and wide ranging types of sensors used in a data center in a manner that significantly reduces the amount of information that needs to be provided to the user. Simply providing every data point obtained from a sensor over a network to the user, or an application being used by the user, could quickly use a good portion of the available bandwidth of a network. This is especially so in a large, modern day data center where many thousands of data points are being obtained from hundreds or more sensors every second.

SUMMARY

In one aspect the present disclosure relates to a method for forming a distributed data store using a remote access appliance associated with a data center infrastructure management (DCIM) system. The method may comprise generating data associated with operation of a managed device being monitored by the DCIM system. At least one remote access appliance may be used to receive the data and to use an element library framework to generate events from the data. The remote access appliance may use a complex event processing subsystem to analyze the events and to generate event related signals therefrom. A bus may be used to transmit the event related signals from the appliance to a common platform services (CPS) subsystem of the DCIM system. The CPS subsystem may be used to receive the event related signals and to use the event related signals to inform the user of an aspect of performance of the managed device.

In another aspect the present disclosure relates to a method for delivering events associated with a managed device being monitored by a data center infrastructure management (DCIM) system. The method may comprise using a service bus proxy subsystem to receive both high priority and non-high priority events, via hypertext transfer protocol (HTTP) transmission, on different channels from a remote access appliance associated with the DCIM system. One of the channels may be assigned as a high priority event channel and another of the channels may be assigned as a non-high priority event channel. An event delivery network may be used to form two separate messaging queues for receiving the events from each of the two channels and transmitting the high priority events and the non-high priority events to separate storage subsystems. The event delivery service may also simultaneously publish at least one of the high priority events and the non-high priority events to at least one of an event viewer and an alarm process.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
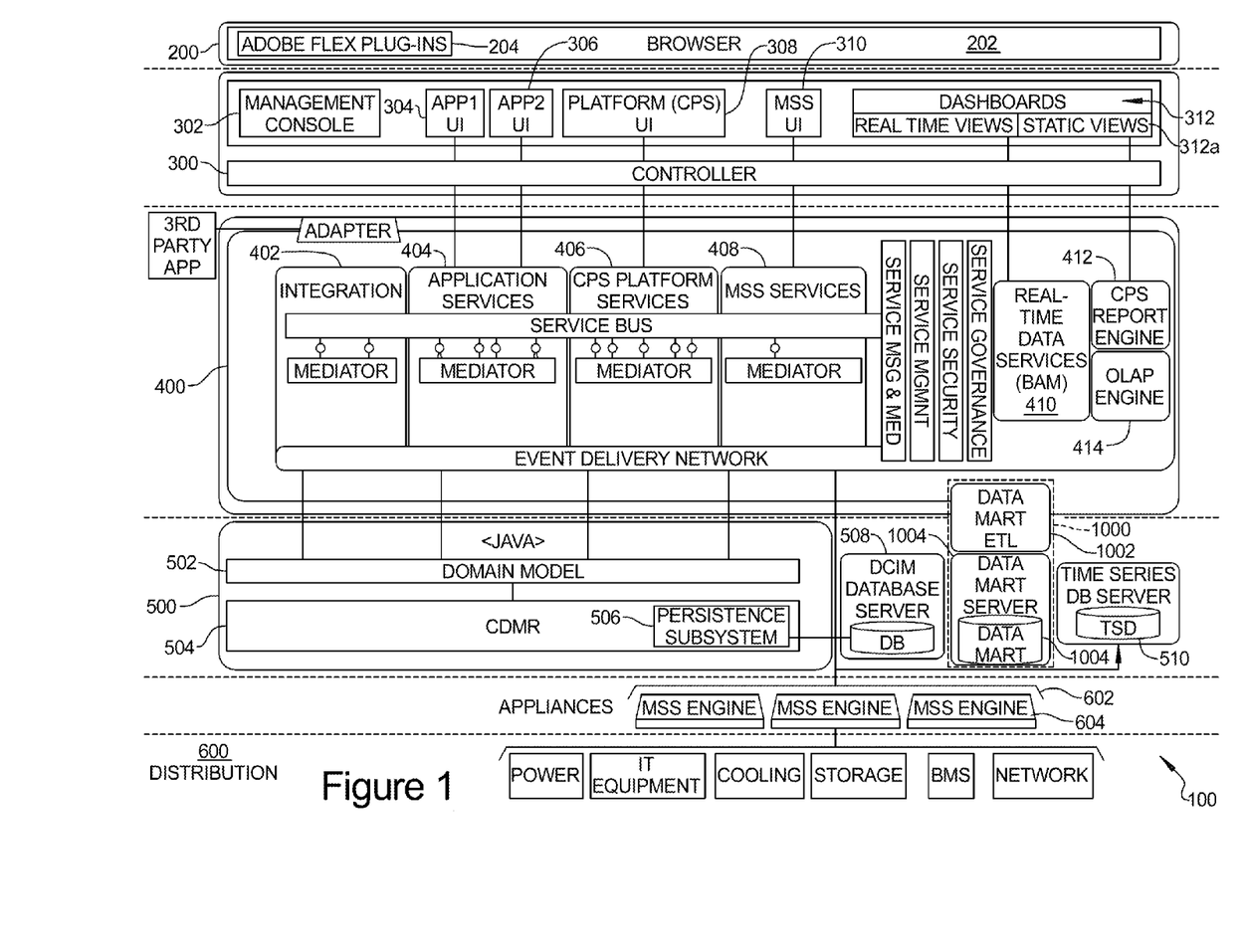
FIG. 1 illustrates a DCIM system in accordance with the present disclosure that incorporates a data mart.

FIG. 1 shows one example of a DCIM system 100 in accordance with the present disclosure having an integrated data mart subsystem 1000. The data mart subsystem 1000 is used to provide enhanced access to recorded data, enhanced reporting of data and enhanced analytic capabilities of data obtained from managed devices within a data center.

The DCIM system 100 shown in FIG. 1 is merely representative of one possible construction, and it will be appreciated that the components of the DCIM system 100 may be varied considerably to suit different specific applications. The DCIM system 100 may include a first (client) presentation layer 200 having a browser 202. One or more plug-ins, such as Adobe Flex plug-ins 204, may also be included. A second (server) presentation layer 300 may include a management console 302, one or more application user interfaces (Us) 304 and 306, a common platform services (CPS) user interface 308, a manageability subsystem services (MSS) user interface 310, and one or more dashboards 312 for presenting information to a user.

A common platform services (CPS) layer 400 forms a shared service infrastructure subsystem that provides individual or composite services that may be used by any product, for example services such as authentication, authorization and auditing. In this example the CPS layer 400 is shown having an integration subsystem 402 and a plurality of shared services 404, 406 and 408. A real time data services subsystem 410 (e.g., a business activity monitoring ("BAM") subsystem), a CPS report engine 412 and an on-line analytical processing ("OLAP") engine 414 may also be included. Shared service 408 forms a manageability subsystem service ("MSS service"), which is a composite service that provides for management (e.g., Discovery, Data Acquisition, Command & Control) of managed devices via a distributed real-time framework.

The DCIM system 100 may also include a data layer 500 having a domain model 502 and a common data model repository ("CDMR") 504. The CDMR 504 may have a persistence subsystem 506 for persisting data to a DCIM database server 508. The data mart subsystem 1000 may form a portion of both the data layer 500 and the services layer 400. The data mart subsystem 1000 may have a data mart extract-transform-load ("ETL") subsystem 1002 and a data mart server 1004. The data mart subsystem 1000 may communicate with the DCIM database server 508, with a time series database (TSD) server 510, and also with one or more components of the services layer 400. The MSS services 408 interact with one or more remote access appliances 602 of a distribution layer 600. Each remote access appliance (hereinafter simply "appliance") 602 may include an MSS engine 604 therein. Each MSS engine 604 may be a software component running on a suitable processor that can be deployed on each appliance 602 to acquire metric data and perform management (e.g., discovery, data acquisition, command and control) on managed equipment being handled by each appliance 602. Each MSS engine 604 may feed collected data to the MSS services 408 as well as to the TSD server 510 and the CDMR 504. It will be appreciated, however, that one or more of the intelligent collection engines (i.e., the MSS engines 604) can also be realized as a software application running in a sever or on a virtual machine.

The data mart ETL service 1002 provides the ability to extract data from other data sources within the DCIM system 100 as well as from the TSD server 510 and the DCIM database server 508. The data mart ETL service 1002 may transform the extracted data into a desired format and then may load the data in the data mart database server 1004. The extract, transform and load functionality may be performed periodically to keep the data mart subsystem 1000 sufficiently populated with data for reporting and analysis. In addition to populating the data mart database server 1004, the data mart ETL service 1002 may also publish events to an event delivery network for key values or information that are consumed by components, such as by a suitable server (e.g., an Oracle "business activity monitoring" ("BAM") server operating as the real time data services subsystem 410).

In operation the data mart ETL service 1002 extracts the appropriate data from the TSD server 510 and the DCIM database server 508 and then transforms and loads this data into the data mart database server 1004. This activity can be driven by specific events which are generated by a manual ETL request or by a user customizable scheduled task. The data mart ETL service 1002 leverages configurations that are set by a user via the management console 302 when a user customizable scheduled task is set up. The preselected configurations of the user customizable scheduled task limit the set of data that is extracted from the TSD server 510 and the DCIM database server 508, and then loaded into the data mart database server 1004.

The data mart subsystem 1000 may also publish events to the CPS layer 400. The data mart ETL service 1002 may generate events indicating successful completion of data being extracted and loaded into the data mart database server

1004. Suitable software services that support the TSD 510 may clean up and/or purge data that has been successfully loaded in to the data mart database server 1004. This activity can be driven by the event generated by the data mart ETL service 1002 when extraction and loading has successfully completed. The CPS report engine 412 and the OLAP engine 414 interact with the data mart database server 1004 and other data stores of the DCIM system 100, such as the TSD server 510, to retrieve data required for reports that are being created. The data that is provided for reports in most instances will need to be restricted to an appropriate set based on authorization and tenancy. Similar data enforcement is provided by the CDMR 504. A "static views" component 312*a* of the dashboards 312 interacts with the CPS report engine 412 and the OLAP engine 414 to retrieve historical information to be presented in a view to the user on a suitable display. The data mart subsystem 1000 may provide a number of highly useful features. One highly useful feature is the ability to backup and restore the data in the data mart database server 1004. Other useful features are the ability to archive and purge selected sets of data in the data mart database server 1004; the ability to restore previously archived and purged data back in to the data mart database server 1004; the ability to restrict data retrieved from the data mart database server 1004 to the appropriate set of data based on user authorization and tenancy; the ability to support aggregation of data points that do not require comparison with thresholds (to be discussed further in the following paragraphs); the ability to support the summary/roll up of data points in different ways (hourly, daily, average, minimum, maximum, etc.); and the ability to be deployed on a separate server to isolate reporting from other operational activities.

Figure 2:
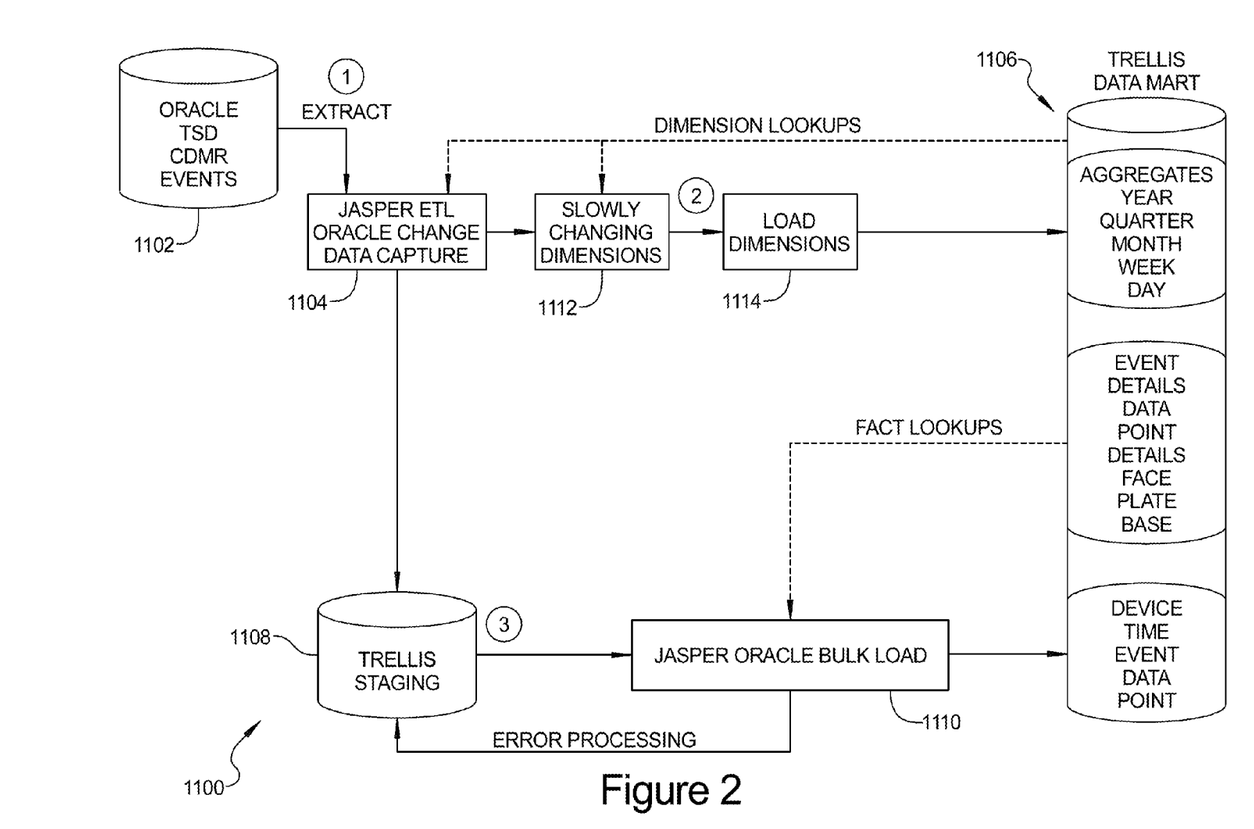
FIG. 2 illustrates another embodiment of the DCIM system showing additional details of how a data mart may be implemented.

Referring now to FIG. 2, a high level diagram 1100 shows another implementation of a data mart subsystem that may be incorporated in the DCIM system 100. The diagram 1100 also illustrates more details on how the extract, transform and load (ETL) architecture of the data mart subsystem may be provided. In this example the various databases discussed above are represented in simplified fashion as one database 1102. An ETL subsystem 1104, which in this example may include, for example, Jaspersoft business intelligence software, available from Jaspersoft Corp., may be used to extract data from the database 1102 as well as to obtain dimension lookups (i.e., data organizing guidelines) from a data mart 1106. The data mart 1106 may store aggregated data that has been aggregated by year, by quarter, by month, by week, by day, or in accordance with any other user defined dimension or guideline. The data mart 1106 may also store details of events, details of data points, and equipment face plate base information. Still further, the data mart 1106 may store, without limitation, information relating to a device, a time, an event or a data point.

A staging area 1108 may be included which is an area where the extracted information may be held temporarily while manipulation or modification of the extracted information is performed if needed. A reporting tool 1110, in this example a Jasper Oracle Bulk Load module, may be used to present extracted data to the data mart 1106 or to look up information in the data mart 1106 pertaining to event details, data point details and equipment face plate values for various managed devices.

Slowly changing dimensions (i.e., ways that data is being collected and or summarized) may also be obtained, as indicated by block 1112 Block 1112 may represent software that analyzes the changes and determines if very slow changes are occurring, which may be applied to the extracted data from the ETL subsystem 1104. The dimensions may be loaded, as represented by block 1114, and then the extracted data may be aggregated in the data mart 1106 in accordance with the loaded dimensions.

Figure 3:
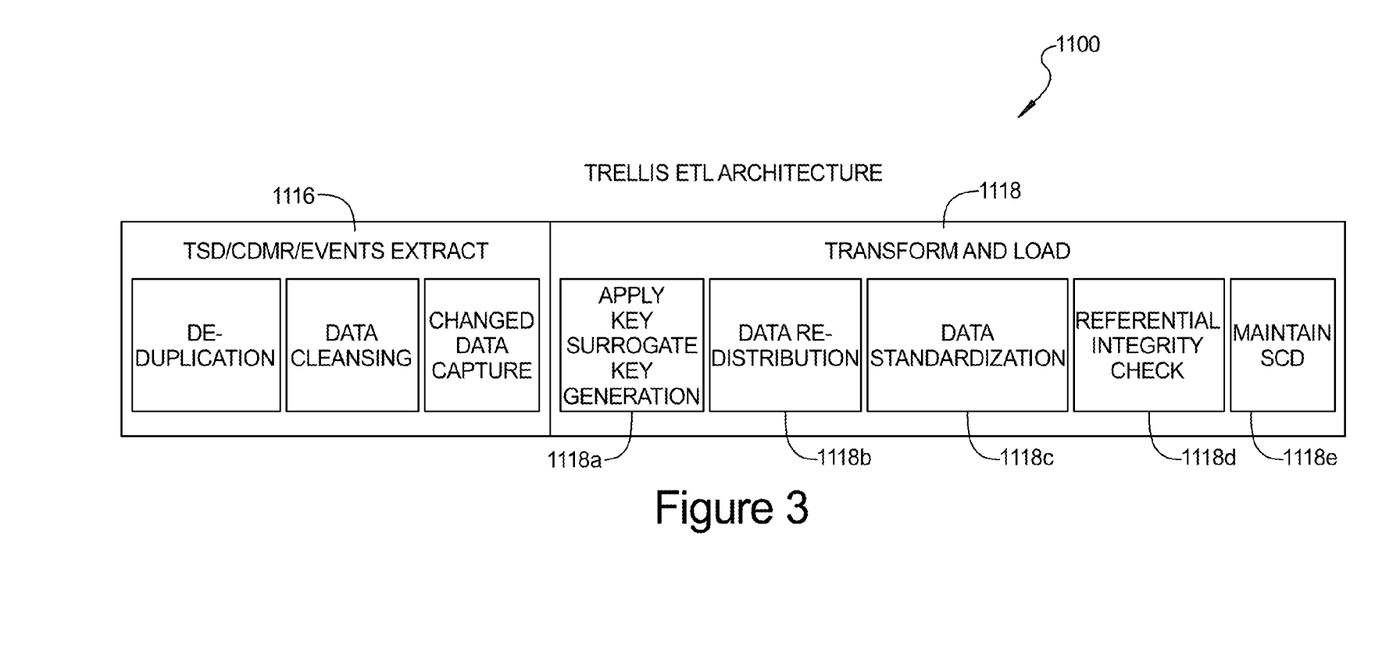
FIG. 3 is a block diagram illustrating various operations that may be performed during the extract, transform and load phases of operation of the data mart ETL service.
Figure 4:
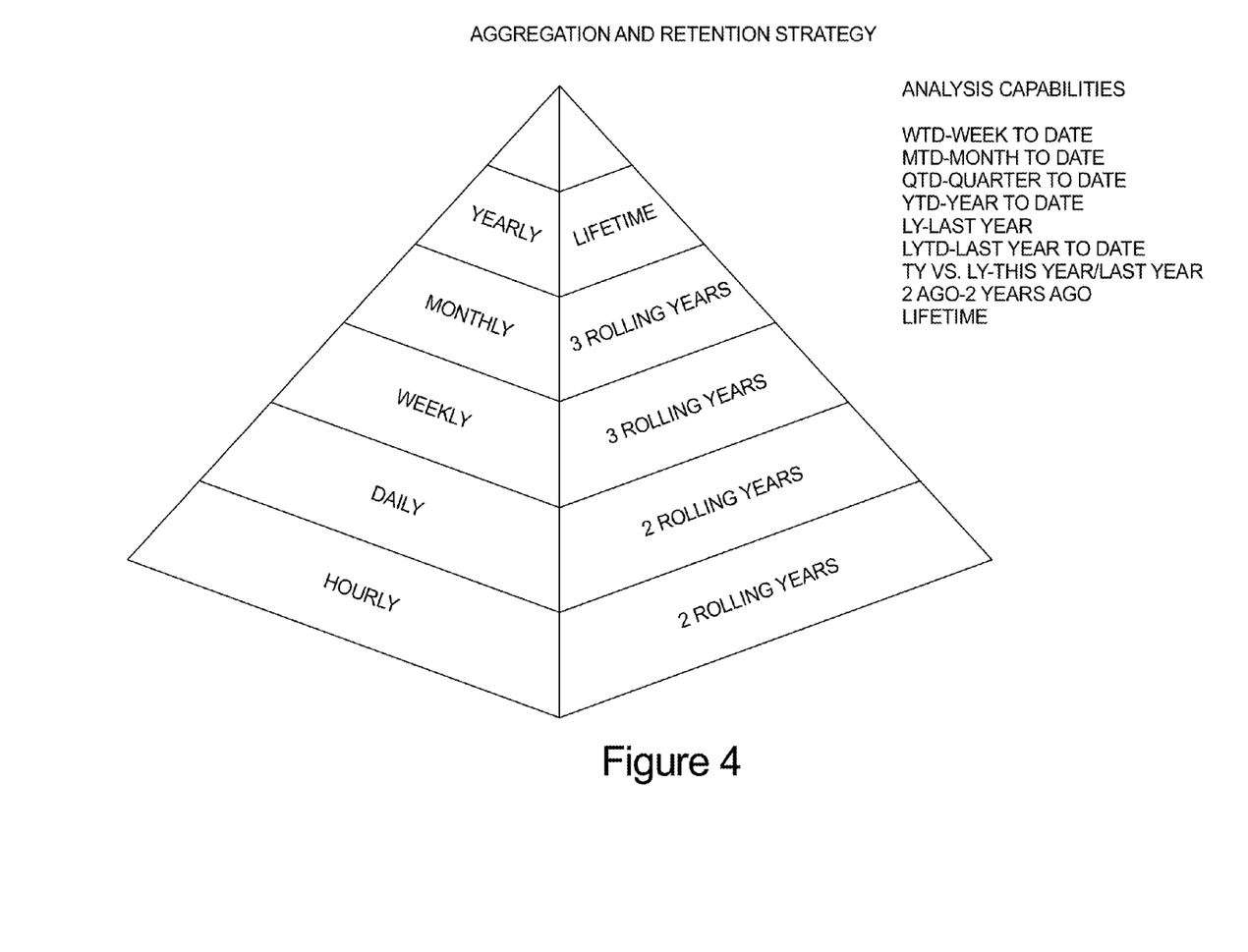
FIG. 4 illustrates a pyramid showing how different aggregation and data retention strategies/policies may be implemented in connection with the data mart of FIG. 1.

Referring to FIG. 3, block 1116 summarizes various software operations that may be performed on the extracted data obtained from the TSD server 510 (FIG. 1), from the CDMR 504 or from extracted events. Block 1118 illustrates specific transform and load operations that may be applied to extracted data. The operation of "Apply Key/Surrogate Key Generation" at block 1118*a* involves applying and generating a surrogate key. Block 1118*b* involves data re-distribution of the extracted data. Block 1118*c* involves data standardization to standardize the data in accordance with predetermined dimensions. Block 1118*d* involves making a referential integrity check. And block 1118*e*, "Maintain SCD" involves maintaining a service component description of specifications. FIG. 4 illustrates an example as to the wide ranging number of ways (i.e., dimensions) that extracted data may be aggregated and reported for use.

A significant advantage of aggregating the extracted data is that it can represent a significant reduction in bandwidth needed to transmit the obtained data over a network, and thus significantly unburdens the network. In many instances it may not be necessary to provide every single collected data point to one or more of the applications that are monitoring various infrastructure components (e.g., computer controlled air conditioning (CRAC) units) or IT (information technology) components in a data center. Often, one or more running averages for different predetermined time intervals may suffice to give the data center operator the needed information as to the operational state of various data center components or the data center environment itself (e.g., temperature and power draw). The raw data points used to perform the aggregation may be accumulated or kept for a certain time period before being overwritten by newly acquired data points. By providing aggregated data in accordance with user defined aggregation policies, this can serve to dramatically reduce the amount of data that needs to be transmitted over a network. Moreover, this can be achieved while still storing every collected data point, at least for a predetermined time, so that all the collected data points for a given time frame will be available upon demand by the data center operator, at least for a limited time. This feature may be highly useful in the event that the data center manager needs to make a detailed study of an event that occurred in the data center at a specific time, and the availability of all data points collected around the specific time frame of interest is important for analysis of the event.

Distributed Event and Data Point Store

Figure 5:
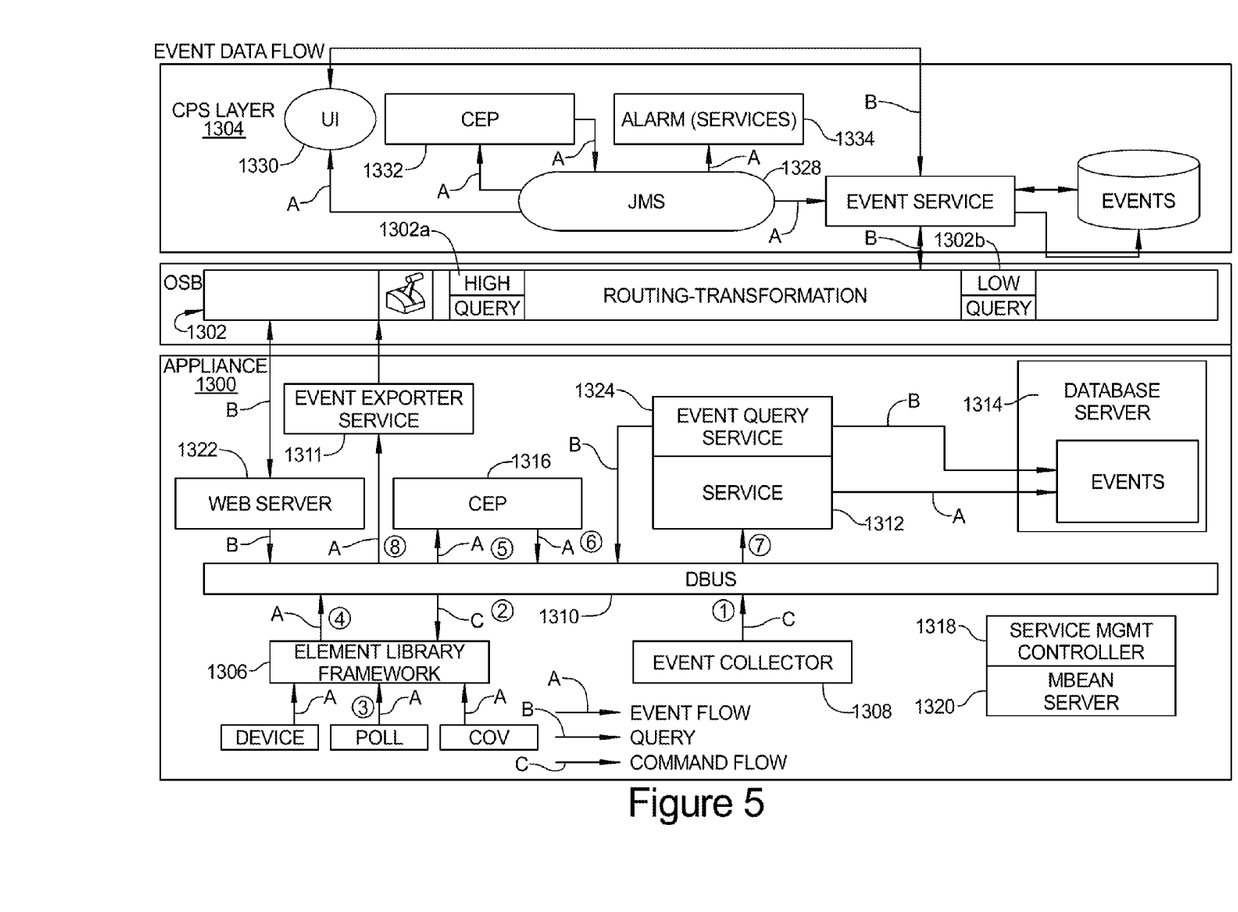
FIG. 5 illustrates another embodiment of a DCIM system of the present disclosure that shows how each DCIM appliance of the DCIM system may include various components so that a group of the appliances may collectively be used to form a "distributed" event store.

Referring to FIG. 5, a high level drawing shows how each remote access appliance 1300 of the DCIM system 100 may include various components so that a group of the remote access appliances 1300 may collectively be used to form a "distributed" event store. In this embodiment the remote access appliance 1300 is in communication with a bus 1302, which in this example may be an Oracle Service Bus ("OSB"). The OSB 1302 operates to route events to a common platform services (CPS) layer 1304 of the DCIM solution 100 (where layer 1304 may also optionally include various components of CPS layer 400 of FIG. 1). In FIG. 5 the arrows marked "A" represent event flow, the arrows marked "B" represent queries, and the arrows marked "C" represent command flows. The remote access appliance 1300 is being used to monitor one or more managed devices or one or more sensors associated with the managed device(s). It will be noted that if communication is lost between the remote access appliance 1300 and the CPS layer 1304, then events and data may be stored in a suitable database in the remote access appliance until such time as communication is restored with the CPS layer 1304.

The remote access appliance 1300 (hereinafter "appliance 1300") may include an element library framework 1306. The element library framework 1306 may be used to perform several functions such as collecting data points and events; normalizing received events based on a predetermined policy; and emitting collected events, data points and SNMP (Simple Network Management Protocol) traps. An event collector 1308 may be used to subscribe for SNMP traps, to collect device events using both "push" and polling models, to emit event collected signals on a data bus 1310, and to normalize events. An event exporter service 1311 formed by machine executable code and running on the remote access appliance's 1300 processor may be used to receive event collected signals. The event exporter service 1311 may be used to update the policy (e.g., add or modify filters), to apply the policy to receive event signals (e.g., so as to exclude event types or events not meeting a threshold severity), and to form at least two channels, 1302a and 1302b, for exporting events. One of the channels, such as channel 1302a, may be designated for high priority events while the other channel 1302b may be designated for all other events, that is, those events that are not deemed to be high priority events.

The appliance 1300 may also include an event store service 1312. The event store service 1312 may be a database with suitable software and hardware that receives signals representing collected events, updates policy (e.g., retention policy), and queries event data (e.g., event type, severity and data range). The event store service 1312 may also asynchronously write raw events to a database 1314, which in this example may be a PostgreSQL (open source) database server.

The appliance 1300 may further include a subsystem for complex event processing (CEP) 1316 for receiving data points, event related signals, and for analyzing events and emitting event generated signals. A service management controller 1318 may be incorporated that can be used to start, stop, pause, resume and update policy for all services operating on the data bus 1310. Another service, such as an MBeans service 1320, may be used to implement remote access to the service management controller 1318.

The appliance 1300 may also include a Web server 1322 that routes RESTful service calls to an event query service 1324. The Web server 1322 also may handle security functions such as authentication and SSL transport, and DOS (denial-of-service) attacks. The Web server 1322 may also contain an audit log.

The OSB 1302 may contain at least one high priority event queue 1302a1 and at least one low priority event queue 1302b1. When the OSB 1302 receives the event push from the appliance 1300 it writes to the high priority queue 1302a1 or the low priority queue 1302b1. Another proxy may read from each queue 1302a1 and/or 1302b1 and publish the event to storage in an events database 1326 within the CPS layer 1304. A Java messaging service (JMS) 1328 may be used to perform messaging operations between a user interface 1330, another subsystem for complex event processing 1332, alarm services 1334 and an event service subsystem 1336. The event service subsystem 1338, which may comprise machine executable code running on a processor, facilitates forwarding events for storage to the events database 1326 as well as handling requests for retrieving stored events from the events database 1326.

An important advantage of the embodiment shown in FIG. 5 is that important events may be "pushed up" to the CPS layer 1304 immediately, while all events may be stored at the appliance 1300 as well (i.e., via database 1314). Stored events can also be retrieved from either the database 1326 at the CPS layer 1304 or from the database 1314 (e.g., PostgreSQL database server). The architecture illustrated in FIG. 5 also forms a "distributed" event recording and retrieval system that is easily scalable. This is because each appliance 1300 will include those subsystems needed for the recording and retrieval of both high and low priority events. As the number of managed devices at a data center expands, appliances 1300 can be easily added to handle the managed devices without requiring modifications to the CPS layer 1304 or the OSB 1302.

Figure 6:
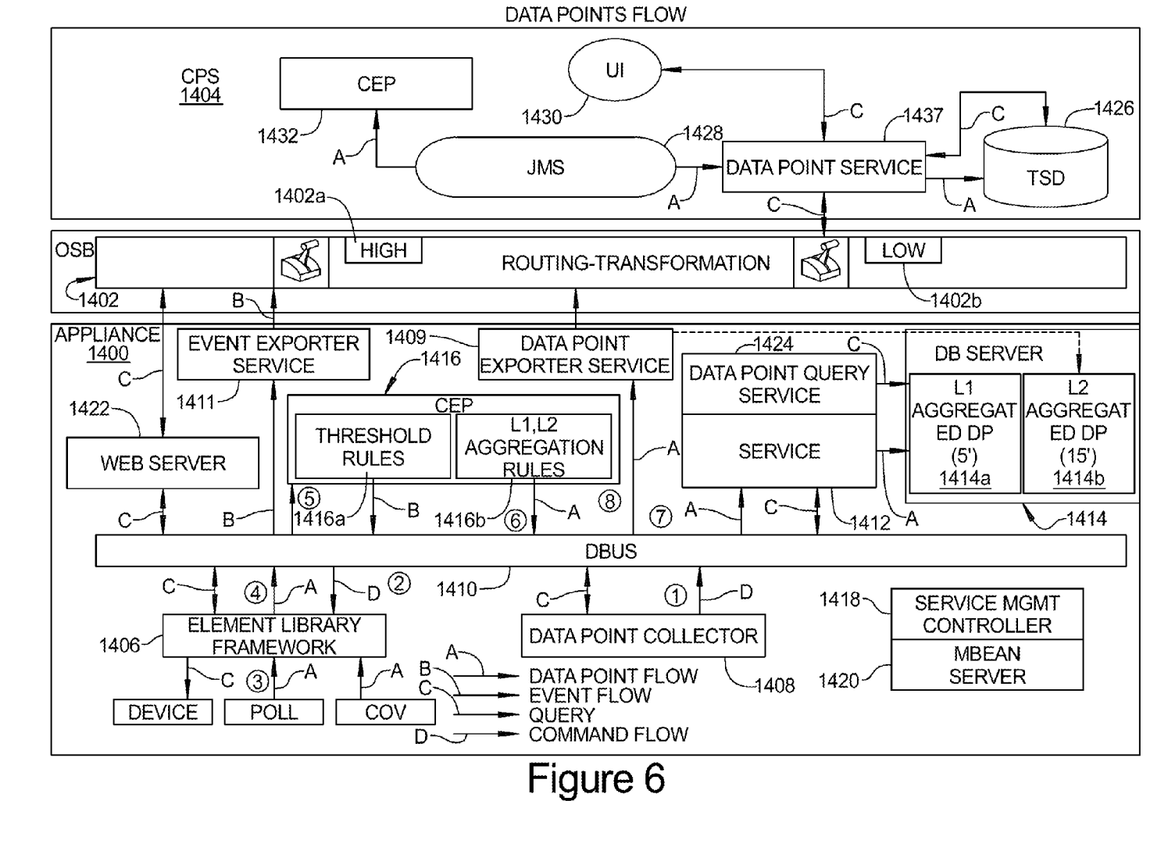
FIG. 6 illustrates another embodiment of a DCIM appliance that may be used by the DCIM system in which the DCIM appliance has a distributed architecture for obtaining, recording and retrieving data points, and which also incorporates two channels for data point routing of data points having different levels of priority.

Referring now to FIG. 6 an appliance 1400 having a distributed architecture for obtaining, recording and retrieving data points is shown. In practice, the architectures illustrated in both of FIGS. 5 and 6 may be incorporated into either appliance 1300 or appliance 1400.

The appliance 1400 in this embodiment, however, includes a CEP subsystem 1416 having a threshold violation subsystem 1416a for monitoring whether predefined rules have been violated. The threshold violation subsystem 1416a may be machine executable code running on the remote access appliance's 1400 processor. The threshold violation (i.e., rules violation) subsystem 1416a may detect when a user set threshold (i.e., rule) has been violated, for example when the obtained data point is higher or lower than the threshold. An aggregation subsystem 1416b, having one or more aggregation rules, may be included in the CEP subsystem 1416 for aggregating the collected data points in accordance with a user defined aggregation policy. A data point store service 1412 may be used to receive data points, to update a retention policy concerning data points and to asynchronously write data points to the database 1414. A data point query service 1424 (i.e., software) running on the appliance's 1400 processor may be included to query data points by date range, device ID, data point ID, or by any other user desired metric.

A data point collector 1408 may be used to schedule tasks for collection in accordance with a user defined policy. An element library framework 1406 may be used to collect data points, to generate data points based on a user selected "change of value" (COV) and to keep the last data point value in a memory thereof. By "COV" it is meant a user defined magnitude of change, either as a percentage or by an absolute value.

The element library framework 1406 may provide a common interface for element libraries (including but not limited to a Java Plugin framework). An element library may be software that allows for the management (discovery, collection, configuration, etc.) of a set of managed devices. An element library may have two components: a "device driver" for a managed element (or set of elements), and the "product knowledge" associated with a managed element (or set of elements). The device driver component may include information related to the protocol to be utilized for communicating with, commanding, etc. a managed element(s). In addition, the device driver component may provide for the normalization of messages (data, etc.) sent from the managed devices to a common standard that is understood by the DCIM system 100, as well as the de-normalization of messages (data, etc.) sent from the DCIM system 100 to the managed devices. The "product knowledge" component can contain information related to the various operational characteristics associated with a managed element(s), including but not limited to what communication protocol(s) are supported by the managed elements and what data point(s), what event(s), commands and threshold rules are relevant for and/or collected by the managed elements. Further, a graphical symbol to be utilized by the DCIM system 100 can be stored within an element library.

The aggregation subsystem 1416b in this example provides two levels of aggregation denoted "L1" and "L2", although more than two levels could easily be implemented. In this example the database 1414 stores the L1 and L2 aggregated data separately, as indicated by data stores 1414a and 1414b, which are in communication with a databus 1410. Datastore 1414a (L1) may aggregate data points obtained every five minutes such as by obtaining/updating a running average every five minutes. Datastore 1414b (L2) maintains a fifteen minute running average of the data points collected. In this manner the number of data points that are stored is condensed considerably. Once a new running average is obtained the previous running average may be discarded. The data points collected during the previous interval may also be discarded. The database 1414 may also contain a map of each of the L1 and L2 aggregated data points that include an average, a minimum and a maximum value for each of the L1 and L2 data points being stored. Data points may be written to storage asynchronously. A data point exporter service 1409 may export the collected data points to an OSB 1402 via HTTPS protocol. The data point exporter service 1409 may be invoked asynchronously for long interval data points. An event exporter service 1411 may be used to export events to the OSB 1402.

The OSB 1402 may also have at least two channels: one channel 1402a for data points from high priority managed devices (or possibly critical managed devices), and a second channel 1402b for data points collected from all other devices that are non-high priority devices (i.e., non-critical managed devices). In case of a connection failure, data points may be written to to the database 1414. Data points may also be exported up to the CPS layer 1404 via the OSB 1402, the JMS (Java Message Service API) 1428, and a data point service 1437 formed by machine executable code and running on a processor. The CPS layer 1404 may also have a CEP 1432 in communication with the JMS 1428. From the data point service 1437 the data points may be transmitted to and stored in a time series database (TSD) 1426 associated with the CPS layer 1404. As with the appliance 1300, the appliance 1400 may also include a service management controller 1418 and an MBeans server 1420. The service management controller 1418 can be used to start, stop, pause, resume and update policy for all services operating on the D-Bus. The MBeans server 1420 may be used to implement remote access to the service management controller 1418.

From the foregoing discussion in relation to FIG. 6 it will be appreciated that a significant advantage is that the collection and aggregation of data points is done in a "distributed" fashion using each appliance 1400. This enables new managed devices to be easily accommodated either through the use of an existing appliance 1400 or through new appliances that are added as the volume of managed devices in a data center increases. Importantly, the data point aggregation occurs at the appliance 1400, which means that the volume of data point information that needs to be transmitted over a network to the CPS layer 1404 will be reduced dramatically. This significantly reduces the bandwidth used on the network in transmitting data point related information. Just as importantly, however, data points that violate a threshold policy may immediately generate an event which can be immediately transmitted up to the CPS layer 1404 using the event exporter service 1411. Still further, users or applications may directly query for data points, essentially in real time, from the managed devices as well as query the database 1414 for stored and aggregated data points.

Figure 7:
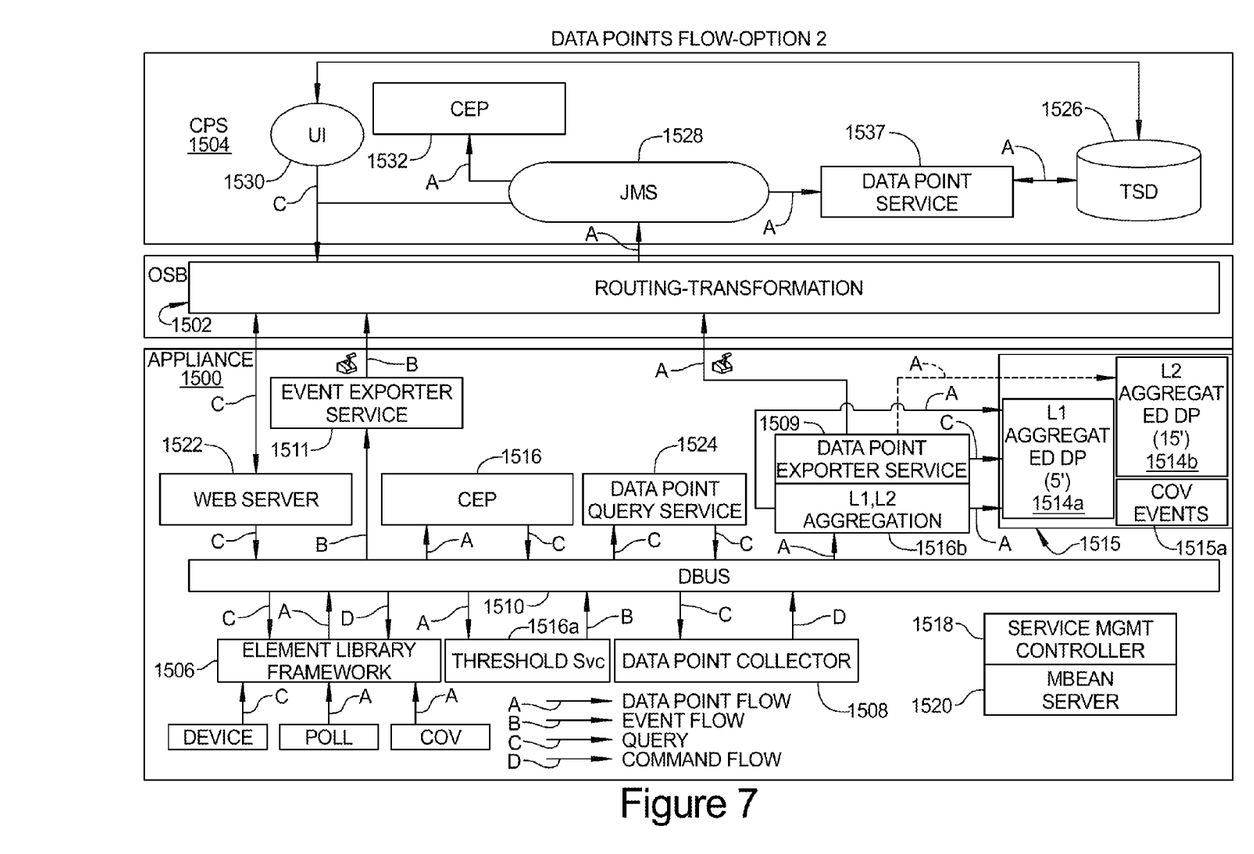
FIG. 7 illustrates another embodiment of a DCIM appliance of the present disclosure which makes use of a threshold monitoring service that generates an event if a threshold is violated, and a PostgreSQL database server that includes a change of value (COV) event data store in which generated events that vary by a predetermined change of value from some standard or percentage are stored.

Referring now to FIG. 7 another embodiment of an appliance 1500 is shown which is somewhat similar to the appliance 1400. Components in common with those of the appliance 1400 are designated with reference numbers increased by 100 over those used to describe the appliance 1400. The appliance 1500 in this example makes use of a threshold monitoring service 1516a (i.e., software) running on the appliance's processor. The threshold monitoring service 1516a generates an event if a threshold is violated. A database 1515 (e.g., a PostgreSQL database server) may include a COV (change of value) event data store 1515a in which generated events that vary by a predetermined change of value from some standard or percentage are stored. The L1 and L2 aggregation are also performed by an aggregation service 1516b which may be comprised of machine executable code running on the appliance's 1500 processor, which is independent of a CEP subsystem 1516 and which forwards aggregated L1 and L2 data points to L1 datastore 1514a and 1514b, respectively. A data point exporter service 1509, which may be in communication with a databus 1510, formed by machine executable code running on the appliance's 1500 processor, also exports data points directly from the aggregation service 1516b. A data point query service 1524, also formed by machine executable code running on a suitable processor, handles queries for data points originating from a CPS layer 1504 which are routed by an OSB 1502 to the appliance 1500. The data point exporter service 1509 also pushes up the aggregated L2 data points to the CPS layer 1504 via the OSB 1502 and a JMS 1528. A data point exporter service 1537 comprised of machine executable code running on a suitable processor directs the aggregated L2 data points being pushed up to a time series database (TSD) 1526 associated with the CPS layer 1504 for storage.

Figure 8:
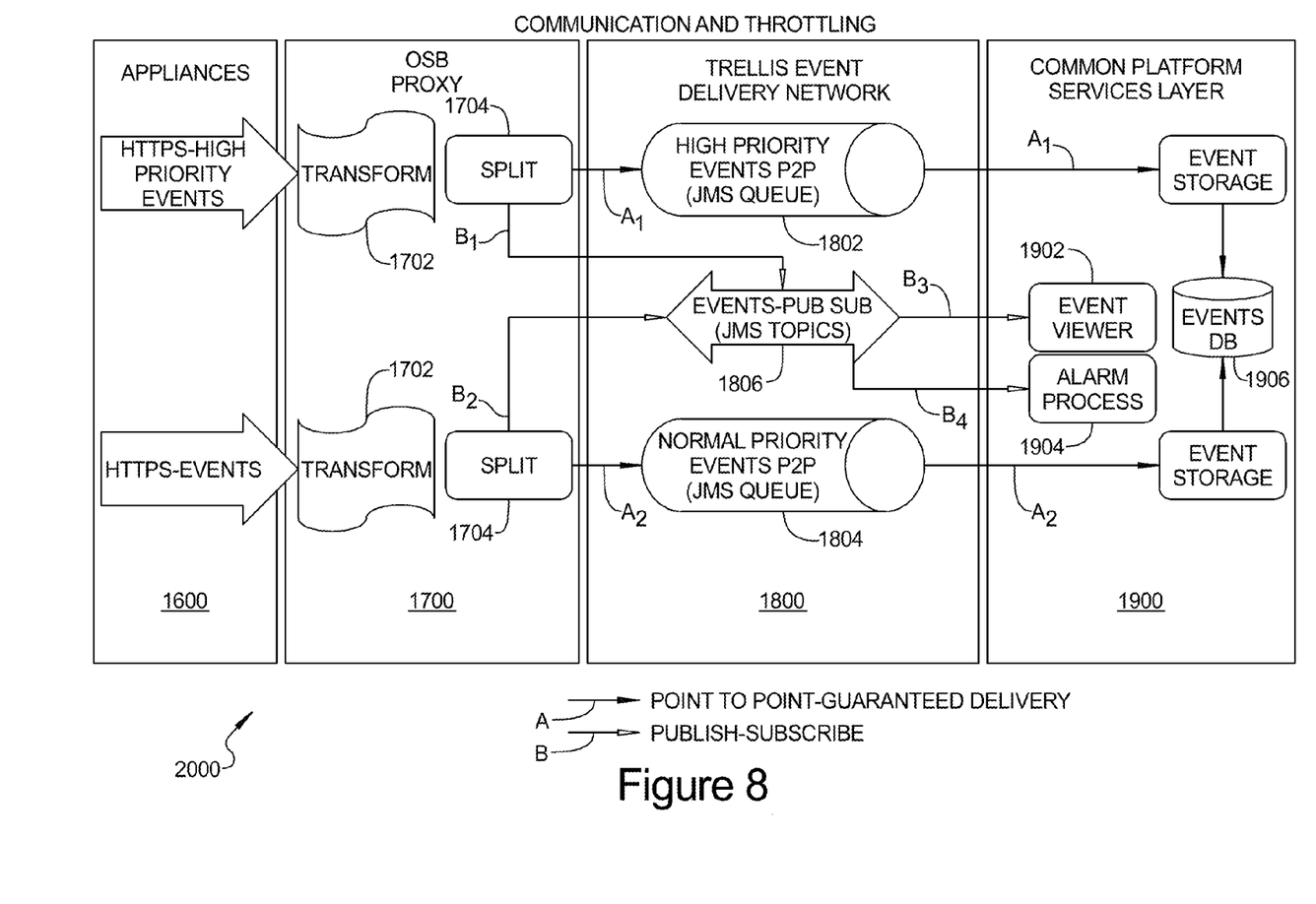
FIG. 8 illustrates an embodiment of a DCIM solution in accordance with the present disclosure in which different communication paths and two queues are used to handle high priority events and non-high priority events separately but simultaneously, to ensure point-to-point guaranteed delivery of events from all of the DCIM appliances.

FIG. 8 illustrates a high level implementation in which communication paths and two queues are used to handle high priority events and normal priority events separately but simultaneously. The implementation shown in FIG. 8 ensures point-to-point guaranteed delivery of events from all appliances 1600. The arrows labeled "A1" and "B1" represent point-to-point guaranteed delivery communication paths and publish/subscribe communication paths, respectively, for high priority events. The arrows labeled "A2" and "B2" represent point-to-point guaranteed delivery communication paths and publish/subscribe communication paths, respectively, for "normal" priority (or "non-high" priority) events. Arrows B3 and B4 represent communication paths that may be shared by both high priority events and normal priority events.

An OSB proxy 1700 may receive both high priority and low priority events on different channels from the appliances 1600 via HTTPS protocol transmissions. The OSB proxy 1700 uses a transform service 1702 to transform and/or normalize both the high priority events and the normal priority events, and then passes the normalized events on to subsystems 1704 that split the events before they are sent to separate queues, such as JMS (Java Messaging Service) queues 1802 (a "High Priority" queue) and 1804 (a "Normal Priority" queue), that form a portion of an event delivery network 1800. A publish/subscribe subsystem 1806 may publish the events (both High Priority and Normal Priority) via communication path B3 to an event viewer 1902 associated with a CPS layer 1900 of the DCIM system 100. The publish/subscribe subsystem 1806 may also publish the events (both High Priority and Normal Priority) to an alarm process 1904 associated with the CPS layer 1900.

In operation the appliances 1600 may send synchronous HTTP requests to the OSB proxy 1700. The OSB proxy 1700 routes these calls to the JMS queues 1802 and 1804. The events, both High Priority and Normal Priority, are also preferably persisted to an events database 1906. The consumer of each queue will receive only one message. In the case where the consumer is unavailable, the message may be delivered until an expiration policy is met. This policy is preferably the same as the retention policy for events persisted on each appliance 1600. This policy is also preferably configurable via a management console. An advantage of this configuration is that if a large volume of events is being reported, and the CPS layer 1900 is unable to keep up with the events being delivered, the events may be queued at the queues 1802 and/or 1804.

Figure 9:
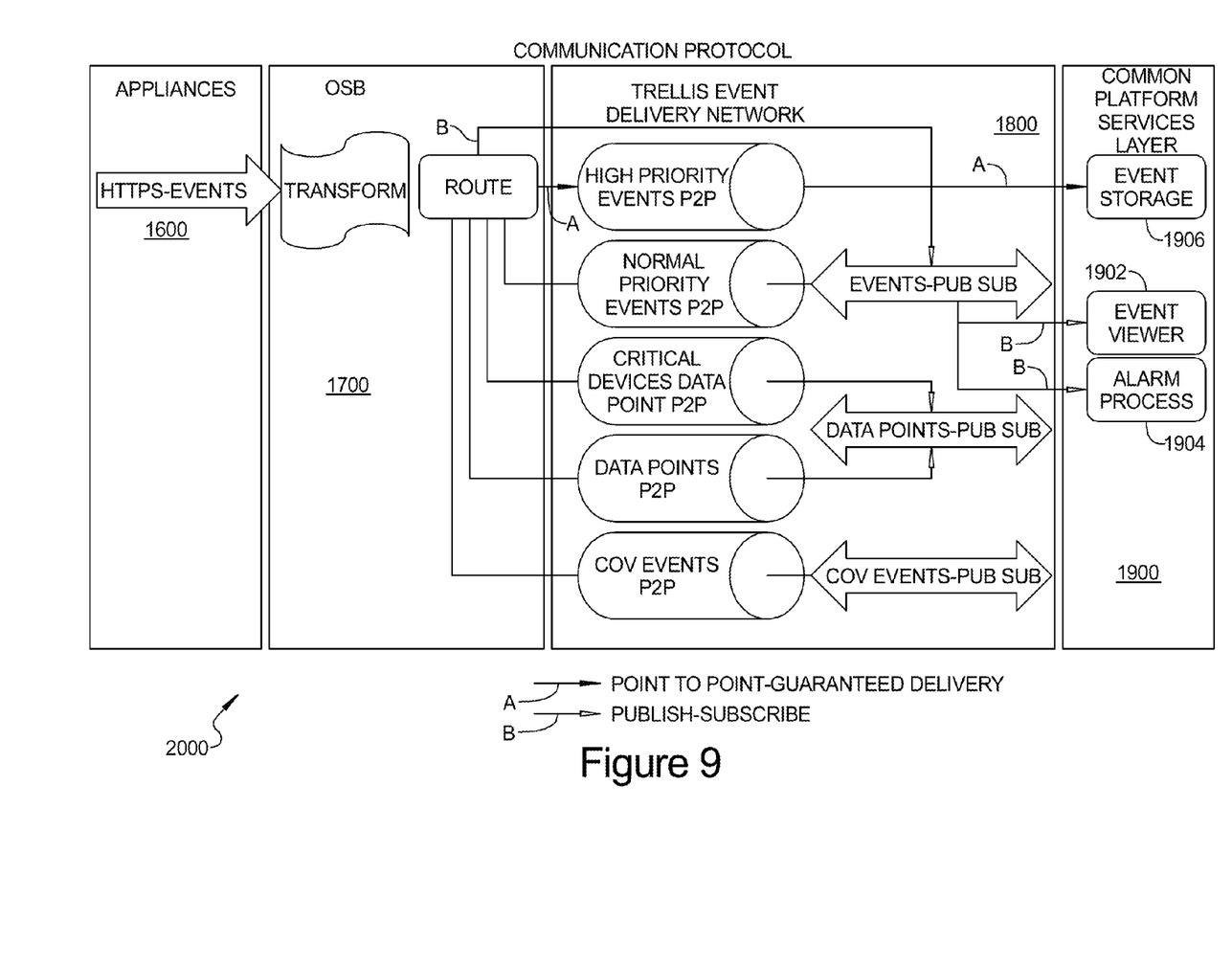
FIG. 9 illustrates another embodiment of a DCIM system in accordance with the present disclosure in which high priority events are detected within an event delivery network and both persisted to a database for event storage, and also delivered, in guaranteed fashion, in accordance with a publish/subscribe policy to an event viewer.

FIG. 9 illustrates another embodiment 2000 somewhat similar to the embodiment of FIG. 8. The embodiment 2000 detects high priority events within the event delivery network 1800 and persists the events to a database 1906 for event storage and delivery, in guaranteed fashion, in accordance with a publish/subscribe policy to the event viewer 1902. The embodiment 2000 also persists the events to an alarm process 1904. Data points from both critical devices and non-critical devices, as well as COV events, may all be delivered to the CPS layer 1900 in accordance with a publish/subscribe policy.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for forming a distributed data store using a remote access appliance associated with a data center infrastructure management (DCIM) system, the method comprising:
 generating data associated with operation of a managed device being monitored by the DCIM system;
 using at least one remote access appliance to receive the data;
 using an element library framework disposed in the remote access appliance to generate events from the data, and also using the remote access appliance to implement a complex event processing subsystem to analyze the events and to generate event related signals therefrom;
 using a bus to transmit the event related signals from the appliance to a common platform services (CPS) subsystem of the DCIM system;
 using the CPS subsystem to receive and use the event related signals to inform a user of an aspect of performance of the managed device;
 using an event exporter service included in a processor of the remote access appliance to form first and second channels for exporting the event related signals, and wherein the first channel is used for ones of the events detected as having a first priority level, and the second channel is used for ones of the events detected as having a second priority level different from the first priority level; and wherein the data received by the element library framework comprises data points, and wherein the element library framework generates at least one of a new event or a new data point based on an analysis of one or more of the data points, in comparison to a user selected change of value (COV).

2. The method of claim 1, wherein using an element library framework comprises at least one of:
 collecting data points obtained by the remote access appliance from the managed device;
 normalizing received events based on a predetermined policy;
 transmitting one or more of the data points collected by the remote access appliance; and
 generating simple network management protocol (SNMP) traps.

3. The method of claim 1, further comprising using an event store service associated with the remote access appliance to receive signals representing collected events and to at least one of:
 update a retention policy for new data; or
 query at least one of event data type, event data severity and event data range.

4. The method of claim 3, further comprising using the event store service to asynchronously write raw events to an open source database.

5. The method of claim 1, further comprising using an event collector to subscribe for simple network management protocol (SNMP) traps generated by the element library framework.

6. The method of claim 1, further comprising using a threshold violation subsystem to detect when a user set threshold has been violated for a collected data point received by the remote access appliance.

7. The method of claim 1, further comprising using an aggregating subsystem to aggregate data points collected by the remote access appliance and to provide first and second levels of aggregation to the collected data points in accordance with two different user set aggregating policies.

8. The method of claim 7, wherein the element library framework comprises data points aggregated in accordance with the first level of aggregation that are stored separately from the data points that are aggregated in accordance with the second level of aggregation.

9. The method of claim 1, further comprising using a data point collector associated with the remote access appliance to schedule tasks for collection in accordance with a user defined policy.

10. The method of claim 1, further comprising using a data point query service to query the data points by at least one of date range, managed device identification or data point identification.

11. The method of claim 1, further comprising using the bus to transmit data points collected from a plurality of managed devices over two channels.

12. A method for delivering events associated with a managed device being monitored by a data center infrastructure management (DCIM) system, the method comprising:
 using an element library framework disposed in a remote access appliance to generate events from data concerning an operation of the managed device;
 using a service bus proxy subsystem to receive both high priority and low priority events, via hypertext transfer protocol (HTTP) transmission, on different channels from a remote access appliance associated with the DCIM system;

assigning one of the channels as a high priority event channel and another of the channels as non-high priority event channel; and using an event delivery network to:

form two separate messaging queues for receiving the events from each of the different channels and transmitting the high priority events and the non-high priority events to separate storage subsystems;

simultaneously publish at least one of the high priority events and the non-high priority events to at least one of an event viewer and an alarm process; and wherein the data received by the element library framework comprises data points, and wherein the element library framework generates at least one of a new event or a new data point based on an analysis of one or more of the data points, in comparison to a user selected change of value (COV).

13. A method for delivering events associated with a managed device being monitored by a data center infrastructure management (DCIM) system, the method comprising:

using an element library framework disposed in a remote access appliance to generate events from data concerning an operation of the managed device;

using a service bus proxy subsystem to receive both high priority and low priority events, via hypertext transfer protocol (HTTP) transmission, on different channels from a remote access appliance associated with the DCIM system;

assigning one of the channels as a high priority event channel and another of the channels as non-high priority event channel; and using an event delivery network to:

form two separate messaging queues for receiving the events from each of the two channels and transmitting the high priority events and the non-high priority events to separate storage subsystems;

simultaneously publish at least one of the high priority events and the non-high priority events to at least one of an event viewer and an alarm process; and wherein the data received by the element library framework comprises data points, and wherein the element library framework generates at least one of a new event or a new data point based on an analysis of one or more of the data points, in comparison to a user selected change of value (COV).

14. The method of claim 12, further comprising:

using a first splitter subsystem to send the high priority events to the messaging queues and a publish subscribe subsystem; and using a second splitter subsystem to send the non-high priority events to the messaging queues and the publish/subscribe subsystem.

15. The method of claim 13, further comprising:

using a first splitter subsystem to send the high priority events to the messaging queues and the publish subscribe subsystem; and using a second splitter subsystem to send the non-high priority events to the messaging queues and the publish/subscribe subsystem.

16. The method of claim 13, wherein the event delivery network further operates to receive critical data points and non-critical data points and to use a publish/subscribe subsystem to publish the critical data points and the non-critical data points.

17. The method of claim 13, wherein the event delivery network operates to receive change of value (COV) events and to use a publish/subscribe subsystem to publish the COV events.

* * * * *